United States Patent [19]

Arakawa et al.

[11] Patent Number: 4,561,072
[45] Date of Patent: Dec. 24, 1985

[54] MEMORY SYSTEM HANDLING A PLURALITY OF BITS AS A UNIT TO BE PROCESSED

[75] Inventors: Takeshi Arakawa; Hiroki Ikeda, both of Tokyo, Japan

[73] Assignee: NEC Corporation, Tokyo, Japan

[21] Appl. No.: 528,389

[22] Filed: Oct. 21, 1983

Related U.S. Application Data

[62] Division of Ser. No. 250,784, Apr. 3, 1981.

[30] Foreign Application Priority Data

Apr. 4, 1980 [JP] Japan .................................. 55-44302

[51] Int. Cl.⁴ .............................................. G11C 13/00
[52] U.S. Cl. ..................................... 365/230; 365/233
[58] Field of Search ............... 365/230, 189, 231, 233, 365/235

[56] References Cited

U.S. PATENT DOCUMENTS 3,643,236  2/1972  Kolankowsky ........................ 365/49
3,753,242  8/1973  Townsend ............................. 365/94
3,772,658 11/1973  Sarlo ................................... 365/189

Primary Examiner—Terrell W. Fears
Attorney, Agent, or Firm—Sughrue, Mion, Zinn, Macpeak & Seas

[57] ABSTRACT

An addressing system for a memory circuit which reads out plural locations simultaneously and then arranges the readout information into a desired sequence or format.

4 Claims, 8 Drawing Figures

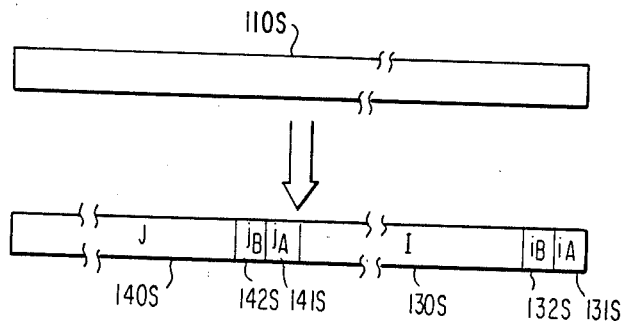
FIG. 3
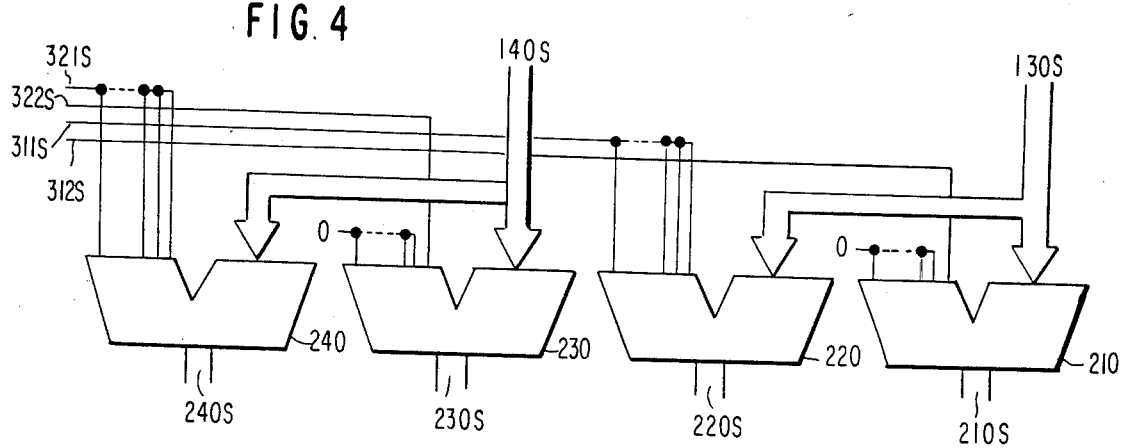
FIG. 4
FIG. 6
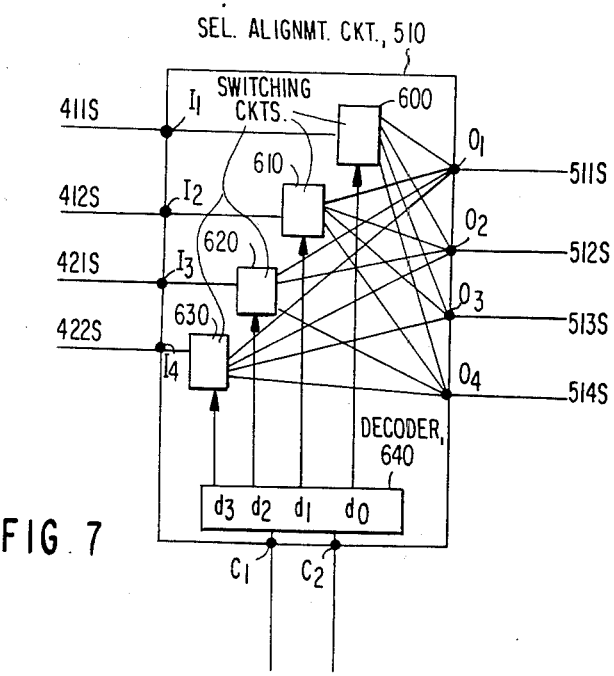
FIG. 7

| 142S | 141S | 132S | 340S | 514S | 513S | 512S | 511S |
|------|------|------|------|------|------|------|------|
| 0 | 0 | 0 | 1 | 421S | 412S | 411S | 422S |
| 0 | 1 | 0 | 0 | 422S | 421S | 412S | 411S |
| 1 | 0 | 1 | 1 | 411S | 422S | 421S | 412S |
| 1 | 1 | 1 | 0 | 412S | 411S | 422S | 421S |

MEMORY SYSTEM HANDLING A PLURALITY OF BITS AS A UNIT TO BE PROCESSED

This is a division of application Ser. No. 250,784, filed Apr. 3, 1981.

BACKGROUND OF THE INVENTION

The present invention relates to a memory system adapted to handle data consisting of a plurality of bits simultaneously, and more particularly to a memory system which is applicable to either or both of the case where a plurality of bits are to be simultaneously taken out from a memory apparatus and the case where a plurality of bits are to be simultaneously stored in a memory apparatus.

A memory system is an especially important system in an information processing system. In general, for the purpose of writing or reading data in or from a memory apparatus, an address system has been employed. According to this system, locations of data stored in a memory apparatus are designated by address virtually allocated to the memory apparatus. In an information processing system, data is transferred between the memory and the information processor under control of an address system.

The data stored in a memory apparatus are organized with binary codes. Various kinds of information representing, for instance, calculation, operand, instruction or command, picture or letter, speech or sound, etc., are stored in a memory apparatus as data.

For example, data representing a picture image can be displayed or printed by well-known display means, such as a cathode ray tube (CRT), or a printer. On the other hand, the data representing the picture image information are processed by a processing apparatus. Frequently executed processing operations are array processing for storing data in a memory apparatus, or transfering data to a display apparatus, processing of partly modifying a displayed picture image, organization processing of data read out of a memory, etc.. For picture image control, as more detailed examples, the following processing operations may be employed: thinning processing, thickening processing recognization processing, remote sensing processing, enlarging processing, contracting processing, and rearrangement processing, etc. of a picture image. As a matter of course, these processing operations are executed, in some cases, over the entire picture, and in other cases they are executed for a part of the picture. These processing operations are commenced by transferring an address to a memory in which picture image data are stored. Upon processing, it is more advantageous for speeding up the processing to handle simultaneously a plurality of bits as picture element data rather than handling the data one bit at a time (serially). Here, one bit corresponds to one picture element, and therefore, the number of memory cells needed (memory capacity) is equal to the number of picture elements of the display screen.

For the above-mentioned reason, an information processing apparatus for controlling a display apparatus is so constructed that a plurality of bits are handled simultaneously. For the purpose of this handling, however, a plurality of bits are transferred to the information processing apparatus from the memory apparatus storing picture element data. As used herein, the term "plurality of bits" refers to partial picture image data.

On the other hand, in the conventional memory apparatus, one bit corresponds to one address, and therefore a plurality of address signals must be applied independently to the memory apparatus to access a plurality of bits. For example, when a information processing apparatus requests partial image data of $N \times M$ bits, the $N \times M$ bits of the partial picture image data are transferred to an information processing apparatus in $N \times M$ memory cycles. As a result, a delay is encountered which may make the data arrive too late for a display apparatus controller to be able to use the partial picture image data. Therefore, it may be considered that a plurality ($N \times M$) of memory apparatuses storing the same picture image data must be employed. In this case, $N \times M$ address signals corresponding to the respective bits in the $N \times M$ partial picture image data are applied to the corresponding memory apparatuses and thereby the $N \times M$ picture element data are read out in a single memory cycle. However, the use of a plurality of memories for storing the composite picture image data requires an enormous memory capacity and thus is uneconomical. Furthermore, there is a disadvantage that the storing speed for the entire memory system is slowed down in proportion to the number of the memory apparatuses. Further, another method has been proposed in which, where the size of the required partial picture image data is $N \times M$ bits and the size of the entire picture image data containing that partial picture image data is $X \times Y$ bits, the $N \times M$-bit partial picture image data are extracted by means of a shift register or the like capable of storing $(N-1) \cdot X + M$ bits. However, this method has a disadvantage that it is impossible to extract partial picture image data at any arbitrary picture element position as their reference position within a short period of time.

Moreover, as disclosed in U.S. Pat. No. 3,938,102, a word organized random access memory system has been also known, which is so constructed that a plurality of bits in a $p \times q$ array can be extracted in one memory cycle. However, this system requires complex routing circuitry having right- and left-rotate functions. In addition, in order to access one block of data ($p \times q$ or $1 \times pq$ bits), a special dividing function for dividing a memory array is necessary. Consequently, the area occupied by a control circuit (an address and control circuiting) on a semiconductor substrate (chip) is large, and this serves as a big bar against circuit-integration, reduction in size and lowering of cost. Moreover, this system can not access a bit designated by a basic address and its peripheral bits.

SUMMARY OF THE INVENTION

It is one object of the present invention to provide a memory system in which it is possible to access a block of data consisting of a plurality of bits stored in a memory apparatus by means of a simple logic circuit.

Another object of the present invention is to provide a memory system having an address circuit which can simultaneously access a plurality of bits in one memory cycle (that is, in one address access period) with a very simple arithmetic circuit and a small number of control signals.

Still another object of the present invention is to provide a memory system having an arrangement circuit to arrange one block of data arbitrarily read from a memory apparatus in a predetermined sequence.

Yet another object of the present invention is to provide a memory system adapted for a picture image processing apparatus and having a novel circuit which can access partial picture image data having N×M bits simultaneously in one memory access.

According to one feature of the present invention, there is provided a memory system comprising an information holding section including a plurality of holding elements storing information, an information accessing section for supplying a read signal to the information holding section, a transfer section for transferring information from the holding elements to a communication bus in response to the read signal, an arrangement section to arrange information on the communication bus according to a predetermined sequence without changing its content, and an output section for outputting the arranged group of information while maintaining its contents.

The memory system according to the present invention is different from the memory system in which merely a plurality of bits are read out of a memory in parallel and are transferred to a central processing unit (CPU) as command information while maintaining the original array. More particularly, according to the present invention, a plurality of bits are selected from bits extracted from the memory and transferred to the CPU. In addition, the selected bits are aligned by rearranging them in a predetermined sequence. It is to be noted that the arrangement section and output section according to the present invention can be provided, as a matter of course, outside of a memory module (for instance, within a CPU or a peripheral controller).

The memory system according to the present invention has the following features:

(1) An accessing section is constructed in such manner that a plurality of holding elements may be simultaneously accessed in response to a basic address, and therefore, the access time for an information holding section can be extremely short, especially in the case where N×M bits extending over a two-dimensional region are extracted from a memory by applying an address corresponding to a center position of the N×M bits. Namely, one bit in assembled information and its adjacent bits are picked out from the information and are simultaneously transferred to a processing apparatus. As a result, this memory system is well adapted for an apparatus in which a plurality of bits having a two-dimensional extension is processed as one unit, such as a picture image processing apparatus.

(2) An arrangement section has a selecting function for selecting necessary bits from the bits read out of a holding section (a memory apparatus) by the accessing section and an aligning function for aligning them in a predetermined sequence. In the case of simultaneously reading out a plurality of bits, a common signal line cannot be used, and therefore, the bits must be transferred through separate individual signal lines. Indeed, it has been already well known in the art of word organized memory systems or bit sliced memory systems to simultaneously read out a plurality of bits from a memory apparatus. However, these known systems can read out only bits of a predetermined memory region. Accordingly, the above-referenced memory systems of the prior art cannot access such bits such that a part of the desired bits is outside the predetermined memory region. However, if a memory system has a memory apparatus in which a memory array is divided to a plurality of blocks, and an accessing means for accessing all of the blocks including a part or all of the necessary bits is provided, it is possible to extract bits from a required memory region. Here, what is important is that only necessary bits must be selected from the selected blocks. The above-described arrangement section is provided by the invention. This arrangement has a special function for removing unnecessary bits from the selected blocks. The arrangement section consists of a very simple logical gate circuit, such as multiplexer circuit or register circuit, which is controlled by an address signal decoding circuit.

BRIEF DESCRIPTION OF THE DRAWINGS

The above-mentioned and other objects, features and advantages of the invention will become more apparent by reference to the following description of a preferred embodiment of the invention taken in conjunction with the accompanying drawings, in which:

FIG. 3 is a data diagram showing contents of a center address 110S of a partial picture image consisting of 3×3 picture elements, FIG. 4 is an address producing circuit diagram including the adders/subtractors 210, 220, 230 and 240 and their input portion in FIG. 2.

FIG. 5 is a schematic view showing the relation between picture element positions $M_0$–$M_{15}$ on a display screen and their addresses, FIG. 6 is a schematic view illustrating one example of the operation of selecting and aligning partial picture image data 500S from among the data taken out of the memories 410, 420, 430 and 440 in FIG. 2, FIG. 7 is a detailed circuit diagram of a selection alignment circuit, and FIG. 8 is a truth table representing the operation of the selection alignment circuit.

DESCRIPTION OF THE PREFERRED EMBODIMENTS

Now the invention will be described in greater detail in with reference to a preferred embodiment thereof as applied to a picture image processing apparatus and with reference to the accompanying drawings. It is to be noted that in this preferred embodiment description will be made, by way of example, with respect to the case where the N×M partial picture image data consist of a two-dimensional array of 3×3 bits. Furthermore, it is assumed that the address serving as a reference of, that is, representative of the addresses designating the positions along the row direction and the positions along the column direction of the partial picture image data is the center address of the partial picture image data consisting of 3×3 bits. The center address designates a center bit of the partial picture image bits on a screen. It is to be noted that whether the data for each picture element may consist of a single bit or a plurality of bits as is the case with, for example, color picture image data, the processing can be achieved through similar control. For the sake of simplicity, here description will be made with reference to the case where the data for each picture element consist of a single bit.

Figure 1:
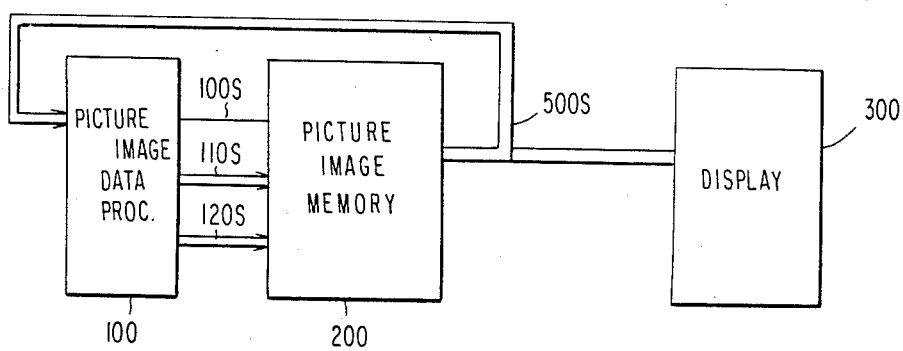
FIG. 1 is a block diagram showing a display control system including a memory apparatus and a picture image processing apparatus.

FIG. 1 shows an overall block diagram of one preferred embodiment of the present invention. In this figure, a display control system comprises a picture image data processing apparatus 100 for carrying out processing of picture image data and input-output control of the picture image data, a picture image memory apparatus 200, and a picture image display apparatus 300. The picture image data processing apparatus 100 delivers as its outputs picture image data 100S, an address designating a memory location corresponding to a center picture element of the partial picture image of 3×3 bits (hereinafter called center address) 110S, and a control signal 120S for carrying out data storage or data reading of the memory apparatus 200. Partial picture image data 500S are obtained under control of the processing apparatus 100. Then, they are transferred through a bus to the processing apparatus 100 and the display apparatus 300 either in parallel or in series. It is also possible to couple the memory apparatus 200 to the display apparatus 300 so that data different from the partial picture image data can be directly transferred to the display apparatus 300 from the memory apparatus 200.

Figure 2:
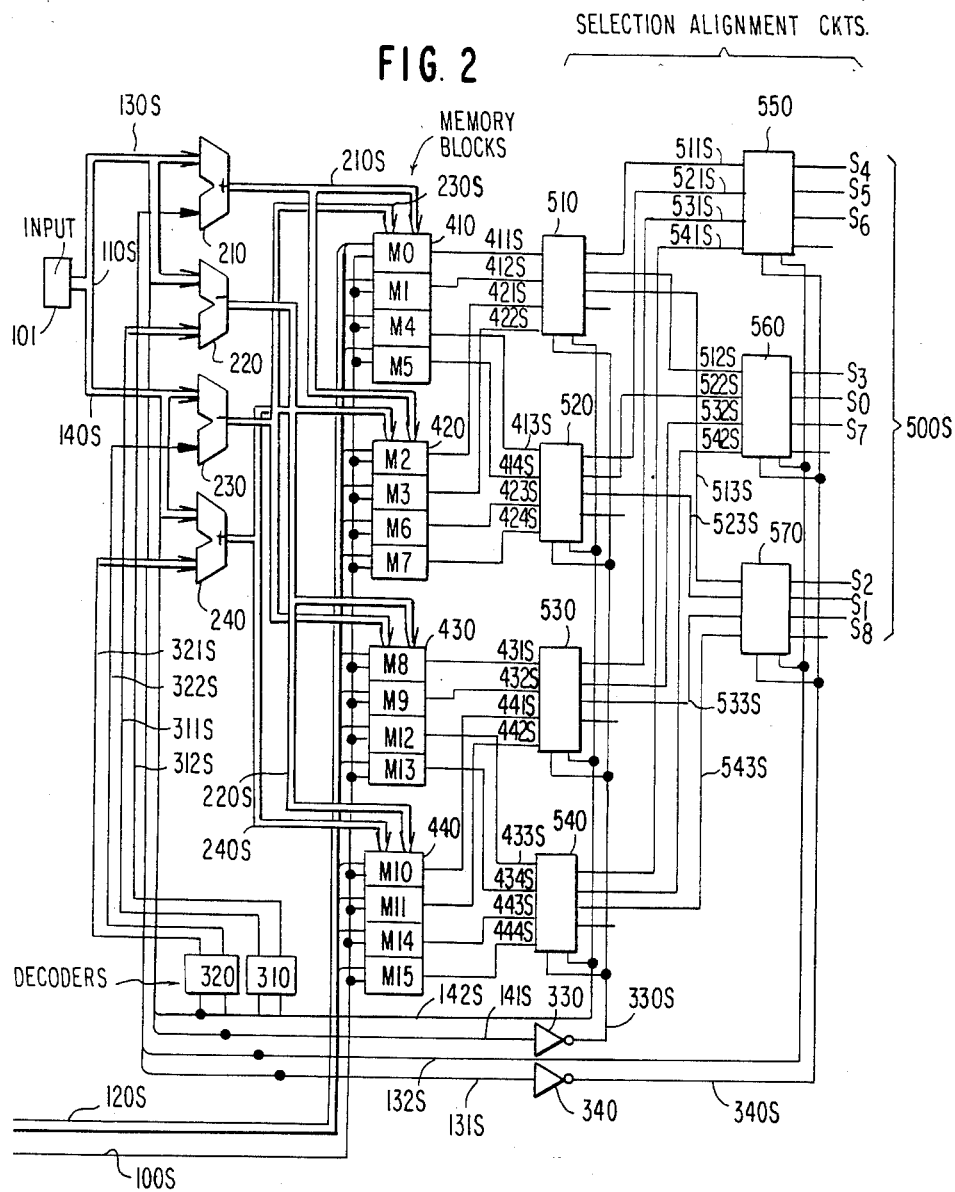
FIG. 2 is a block diagram of a circuit of a picture image memory system 200 in FIG. 1.

FIG. 2 is a block diagram showing in detail the internal circuit construction of the picture image memory apparatus 200. The center address 110S of the partial picture image data region of 3×3 bits supplied from an address generator of the processing apparatus 100 in FIG. 1, is applied to an input portion 101. In this case, the processing apparatus 100 transfers addresses corresponding to the respective picture elements on a screen of the display apparatus (CRT, Braun Tube, etc.) 300 to the memory apparatus 200 as virtual addresses. Accordingly, the processing apparatus 100 can generate a sufficient number of addresses for designating all the picture elements on the screen. Moreover, the address consists of address bits for designating one row line and other address bits for designating one column line of the picture elements array of the screen, and is composed of a plurality of bits as one address. In the center address 100S transferred to the input portion 101, upper address bits 130S designate a row line and are transferred in common to an adder 210 and a subtractor 220. On the other hand, lower address bits 140S designate a column line and are transferred in common to an adder 230 and a subtractor 240. Furthermore, the least significant two bits of the respective address bits 130S and 140S are respectively applied to decoder circuits 310 and 320.

The memory apparatus 200 has memory cells with a capacity for storing picture element data for one picture image or frame, that is, it includes memory cells equal in number to the picture elements on a screen. Now, when a display screen consists of m×n picture elements, there are n×m cells for storing picture image data in the memory apparatus 200. In this case, therefore, the number of the upper and lower address bits (X, Y) are equal to log m/log 2 and log n/log 2, respectively. The processing apparatus 100 applies X+Y bits as one center address to the input portion 101. It is to be noted that an address for the picture element array of the screen in this embodiment corresponds to an address for the memory cells of the memory apparatus 200. Consequently, memory bits corresponding to a required picture image region on the screen can be taken out from the memory apparatus 200.

Here, the picture elements of the screen are imaginarily divided into m/4×n/4 large blocks so that each of the large blocks includes sixteen picture elements. Each of the large blocks are, in turn, imaginarily divided into four small blocks and each of the small blocks includes four picture elements.

The memory cell array in the memory apparatus 200 is divided into m/4×n/4 large blocks in which each of the large blocks includes sixteen memory cells as well as picture element array. Each of the large blocks of the memory cell array is also divided into four small blocks including four respective memory cells. One of the large blocks including four small blocks 410, 420, 430 and 440 is shown in FIG. 2. Data of four memory cells of small blocks can be accessed simultaneously in response to one address. As a matter of course, the 4-bit data are respectively transferred through independent signal lines.

On the basis of the results of decoding in the decoder circuits 310 and 320, the adders 210 and 230 and the subtractors 220 and 240 excecute addition and subtraction according to the conditions as fully described below.

FIG. 3 is an address construction diagram showing the contents of the center address 110S of the partial picture image of the 3×3 bits applied to the adders 210 and 230 and the subtractors 220 and 240. The center address 110S is divided into two portions representing the row direction address and the column direction address. The contents of the more significant bits of the row direction address 140S are denoted by I, and the contents of its least significant two bits 141S and 142S are denoted by $i_A$ and $i_B$, respectively. Likewise, the contents of the more significant bits of the column direction address 130S are denoted by J, and the contents of its least significant two bits 131S and 132S are denoted by $j_A$ and $j_B$, respectively. In response to the least significant two bits 141S and 142S of the row direction address 140, the 2-bit decoder circuit 320 shown in FIG. 2 generates decoded signals (control signals) 321S and 322S in the following manner:

(i) if $i_A=i_B=0$, then the decoded output signals 321S=1 and 322S=0

(ii) if $i_A=i_B=1$, then the decoded output signals 322S=1 and 321S=0

(iii) if $i_A \neq i_B$ then the decoded output signals 321S=322S=0

Likewise, in response to the least significant two bits 131S and 132S of the column direction address 130, the 2-bit decoder circuit 310 shown in FIG. 2 generates decoded signals 311S and 312S in the following manner:

(i) if $j_A=j_B=0$ then the decoded output signals 311S=1 and 312S=0

(ii) if $j_A=j_B=1$, then the decoded output signals 312S=1 and 311S=0

(iii) if $j_A \neq j_B$, then the decoded output signals 311S=312S=0

The respective outputs (addresses) 210S, 220S, 230S and 240S of the adders 210 and 230 and subtractors 220 and 240, respectively, controlled by the decoded output signals 311S, 312S, 321S and 322S are in the following states:

if $i_A=i_B=0$, then the resultant output 240S=I+(−1)=I−1, if $i_A=1$ and $i_B=0$, then the resultant output 240S=I−0=I, if $i_A=i_B=1$, then the resultant output 230S=I+1, if $i_A=0$ and $i_B=1$, then the resultant output 230S=I+0=I, if $j_A=j_B=0$, then the resultant output 220S=J+(−1)=J−1, if $j_A=1$ and $j_B=0$, then the resultant output 220S=J−0=J, if $j_A=j_B=1$, then the resultant output 210S=J+1, if $j_A=0$ and $j_B=1$, then the resultant output 210S=J+0=J, Consequently, if a center address 110S as illustrated in FIG. 3 is inputted, then designation of the addresses of the memories 410, 420, 430 and 440 is made in the following manner:

address of memory 410: always at (I or (I+1), J or (J+1) ), address of memory 420: always at (I or (I−1), J or (J+1) ), address of memory 430: always at (I or (I+1), J or (J−1) ), address of memory 440: always at (I or (I−1), J or (J−1) )

FIG. 4 is a block diagram showing an input portion of the adders 210 and 230 and subtractors 220 and 240. Inputs to the adder 210 are the column address 130S and control signal 312S. Inputs to the subtractor 220 are the column address 130S and control signal 311S.

FIG. 5 is a schematic view showing the relation between a picture element array on a screen and the addresses of the elements thereof. An assembly of a picture element array is imaginarily divided into large blocks each consisting of 16 bits and into small blocks each consisting of 4 bits. To the small blocks of memory cell array 410-440 are allotted the picture elements in the respective small blocks in the following manner:

to memory block 410: $M_0$, $M_1$, $M_4$ and $M_5$
to memory block 420: $M_2$, $M_3$, $M_6$ and $M_7$
to memory block 430: $M_8$, $M_9$, $M_{12}$ and $M_{13}$
to memory block 440: $M_{10}$, $M_{11}$, $M_{14}$ and $M_{15}$ In this embodiment, there are m/2×n/2 memory blocks 410 in the memory apparatus. Also, the memory apparatus has m/2×n/2 memory blocks for each of the remaining blocks 420, 430 and 440. The address 210S is applied in common to the all of the memory blocks 410 and 420. The address 220S is applied in common to the memory blocks 430 and 440. On the other hand, the address 230S is applied in common to the memory blocks 410 and 430. The address 240S is applied in common to the memory blocks 420 and 440. In response to the different combinations of the column direction and row direction addresses 210S, 220S, 230S and 240S, respective picture element data 411S-414S, 421S-424S, 431S-434S and 441S-444S can be read out from the respective memory cells 410, 420, 430 and 440. Consequently, data for 16 picture elements in total can be read simultaneously from the four small memory blocks.

The least significant two bits 131S and 132S in the row direction address 130S output from the data processing system 100 in FIG. 1 and the least significant two bits 141S and 142S in the column direction address 140S are respectively decoded by decoder circuits 310 and 320 to generate decoded output signals 311S, 312S, 321S and 322S, and the respective least significant two bits 131S, 132S, 141S and 142S are also transferred as control signals to selection alignment circuits 510, 520, ----, 570 added in the subsequent stage of the memory cell array. Predetermined selection control is effected by these selection alignment circuits, and thereby partial picture image data 500S (9 bits of $S_0$-$S_8$) are selected, aligned and then outputted.

Now, the procedure of extracting partial data of 3×3 bits in the case where the center address is (I, 0, 0; J, 0, 0) will be explained in further detail with reference to FIGS. 2, 4 and 5. When the following address is designated as assumed above:

row direction address:
140S=I=I
141S=$i_A$=0
142S=$i_B$=0 column direction address:
130S=J=J
131S=$j_A$=0
132S=$j_B$=0 then, according to the preceding description, the adders 210 and 230 and the subtractors 220 and 240 controlled by the control signals supplied from the 2-bit decoder circuits 310 and 320 shown in FIG. 2 will generate addresses adapted to select the memory blocks designated by the following addresses:

memory 410: $M_0$, $M_1$, $M_4$ and $M_5$ at the address of (I, J)

memory 420: $M_0$, $M_2$, $M_6$ and $M_7$ at the address of ((I-1), J)

memory 430: $M_8$, $M_9$, $M_{12}$ and $M_{13}$ at the address of (I, (J−1))

memory 440: $M_{12}$, $M_{11}$, $M_{14}$ and $M_{15}$ at the address of ((I−1), (J−1))

As a result, picture elements of 16 bits ($M_0$-$M_{15}$) are simultaneously selected and read from the small memory blocks. A circuit section for selecting 9-bit data having $M_0$ at their center and aligning them is provided by the selection alignment circuits 510-570. Here, by way of example, a circuit adapted to select and align picture elements $S_0$-$S_8$ ($M_0$, $M_1$, $M_{13}$, $M_{12}$, $M_{15}$, $M_3$, $M_7$, $M_4$ and $M_5$) having the picture element $S_0$ ($M_0$) as a center picture element to provide partial picture image data of 3×3 bits output from the memory as shown in FIG. 6 is illustrated.

FIG. 7 is a functional block diagram of a circuit 510 as an example of the selection alignment circuits 510-570 shown in FIG. 2. In addition, FIG. 8 shows a truth table which describes the operation of the selection alignment circuit.

The circuit 510 has four input terminals $I_1$-$I_4$ for receiving data bits 411S, 412S and 422S, respectively, two control terminals $C_1$ and $C_2$ for receiving control signals 142S and 330S, and four output terminals 511S - 514S. The control signal 332S is an inversion of the signal 141S obtained by inverter 330 in FIG. 2. The circuit 510 further includes switching circuits 600, 610, 620 and 630 to which the data bits 411S, 412S, 421S and 422S are respectively applied, and a decoder circuit 640 to which the control signals 142S and 330S are applied via the control terminals $C_1$ and $C_2$. The decoder circuit 640 generates four decoding signals $d_0$-$d_3$ for selecting output terminals ($O_1$-$O_4$) upon which the input bit data is to be outputted, in response to the contents of the two control signals 142S and 330S. The format or sequence of the output data is determined by control signals, the state of which is set by the lowest two bit of the row address 140S, so as to fulfill conditions in FIG. 8.

Other circuits 520, 530 and 540 have the same function as the circuit 510. The circuits 520, 530 and 540 are different from each other only in the input data thereto, as shown in FIG. 2. The circuits 550, 560 and 570 coupled to the circuits 510-540 may also have the same function and structure as the circuit 510 except for input data and control signals. The circuit 550 receives data bits 511S, 521S, 531S and 541S at its input terminals and the control signals 132S and 340S at its control terminals. The control signals 132S and 340S are the lowest two bits of the column address 130S. The circuit 560 receives the data bits 512S, 522S, 532S and 542S from the circuits 510-540, respectively. Further, the circuit 570 receives the data bits 513S, 523S, 533S and 534S from the four circuits 510-540, respectively. Also, these two circuits 560 and 570 are controlled by the control signals 132S and 340S.

Now, it is noted that each of the first output terminals $O_1$ of the circuits 510–540 is connected to the input terminals of the circuit 550. The second output terminals $O_2$ of the circuits 510–540 are connected to the input terminals of the circuit 560. The third output terminals $O_3$ of the circuits 510–540 are connected to the circuit 570. However, the fourth output terminals $O_4$ of the circuits 510–540 are not coupled to anywhere, but are left open. Similarly, the fourth output terminals of the circuits 550–570 are left open. This is because these selection circuits 510–570 must select only 9 bits of data from among 16 bits data, and therefore, the fourth terminal and its wiring of the circuits 510–570 can be omitted.

As will be apparent from the wiring diagram shown in FIG. 2, the 16 picture element bits read from the memory cell array are arrayed in the sequence of $M_0$, $M_1$, ---, $M_{15}$ in the circuits 510 to 540. In other words, the randomly read data of the respective memory blocks are arranged in sequence. Among the respective arrayed picture element data, the data represented by hatched portions in FIG. 6 are cut away, and then they are set in the subsequent circuits 550 to 570. Further, the picture element data output from the circuits 550 to 570, as per the truth table in FIG. 8, are the desired 9-bit data $S_0$–$S_8$.

While an example in which 9-bit partial data having $M_0$ at the address (I, J) as a center picture element are extracted was explained in the above preferred embodiment, it will be obvious that even when another arbitrary address is given, 9-bit partial data having that given address at their center can be read out which is aligned regularly.

Here, it is to be noted that the selection alignment circuits 510–570 can be simply realized by means of shift registers, multiplexses, switching circuits, etc.

According to the present invention, as described above, since the memory capacity is only required to store picture element data for one frame, the cost of the memory becomes very low. In addition, since partial picture image data can be read one in one memory access, high-speed picture processing can be achieved. Moreover, by merely designating one arbitrary address, a block of data having the designated address at its center can be freely extracted, from the memory apparatus simultaneously.

What is claimed is:

1. A memory system, comprising; a plurality of memory blocks, each memory block storing a plurality of information units, means for receiving an address which designates one information unit stored in one of said memory blocks, a plurality of address producing means, each having an arithmetic function, means for supplying said address received at said address receiving means to each of said address producing means in common, means for generating a plurality of data to be added to or subtracted from said address, means for supplying said data to respective address producing means, each of said address producing means performing an arithmetic operation using said address and said supplied data to produce a new address, respectively, means for applying the new addresses produced by said plurality of address producing means to respective memory blocks, and means for simultaneously reading a plurality of information units designated by said new addresses out of said plurality of memory blocks.

2. An image processing system, comprising;
   memory means for storing a plurality of image data to be displayed;
   means for receiving a center address designating one image data within said plurality of image data;
   means for producing peripheral addresses designating a plurality of peripheral image data adjacent to said one image data designated by said center address;
   means for reading said one image data and said plurality of peripheral image data out of said memory means, simultaneously, according to said center address and said peripheral addresses;
   means coupled to said reading means for arranging the plurality of read-out image data according to the order in which they are to be displayed; and
   display means coupled to said arranging means for displaying the arranged image data.

3. A memory system as claimed in claim 1, in which said plurality of address producing means are divided into a first group of row address producing means and a second group of column address producing means, one of said row address producing means and one of said column address producing means being coupled to a respective memory block by means of predetermined wiring paths, respectively.

4. A memory system as claimed in claim 1, in which said generating means generates said plurality of data in accordance with the content of a portion of said address received at said receiving means.

* * * * *